US012012865B2

(12) United States Patent
Glavicic et al.

(10) Patent No.: US 12,012,865 B2
(45) Date of Patent: Jun. 18, 2024

(54) TAILORED MATERIAL PROPERTY TUNING FOR TURBINE ENGINE FAN BLADES

(71) Applicants: Rolls-Royce North American Technologies Inc., Indianapolis, IN (US); Rolls-Royce Corporation, Indianapolis, IN (US)

(72) Inventors: Michael Glavicic, Avon, IN (US); Daniel E. Molnar, Jr., Lebanon, IN (US); Matthew Jordan, Indianapolis, IN (US); Michael Meyer, Greenwood, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 309 days.

(21) Appl. No.: 17/564,455

(22) Filed: Dec. 29, 2021

(65) Prior Publication Data

US 2023/0203953 A1 Jun. 29, 2023

(51) Int. Cl.

*F01D 5/16* (2006.01)
*C21D 9/00* (2006.01)
*C22F 1/18* (2006.01)

(52) U.S. Cl.

CPC ............. *F01D 5/16* (2013.01); *C21D 9/0068* (2013.01); *C22F 1/183* (2013.01); *F05D 2240/304* (2013.01); *F05D 2260/961* (2013.01); *F05D 2300/701* (2013.01)

(58) Field of Classification Search

CPC ......... F05D 2240/304; F05D 2260/961; F05D 2300/701; C22F 1/183; C21D 9/0068; F01D 25/04; F01D 5/147; F01D 5/16

See application file for complete search history.

(56) References Cited

U.S. PATENT DOCUMENTS

| | | | |
|---|---|---|---|
| 6,428,278 | B1 | 8/2002 | Montgomery et al. |
| 6,471,482 | B2 | 10/2002 | Montgomery et al. |
| 7,500,299 | B2 | 3/2009 | Dupeux et al. |
| 8,137,053 | B2 | 3/2012 | McMillan |
| 8,656,589 | B2 | 2/2014 | Kurt-Elli |
| 8,834,098 | B2 | 9/2014 | Glaspey |
| 9,097,125 | B2 | 8/2015 | Ghorbani et al. |
| 9,121,284 | B2 | 9/2015 | Pope |
| 10,215,194 | B2 | 2/2019 | Theratil et al. |
| 10,374,459 | B2 | 8/2019 | Maniktala |
| 10,458,436 | B2 | 10/2019 | Theratil et al. |
| 10,670,041 | B2 | 6/2020 | Theratil et al. |
| 10,808,543 | B2 | 10/2020 | Gerlotti et al. |
| 10,823,203 | B2 | 11/2020 | Theratil et al. |
| 10,865,806 | B2 | 12/2020 | Veitch et al. |
| 10,865,807 | B2 | 12/2020 | Theratil et al. |
| 11,073,021 | B2 | 7/2021 | Roche |
| 2018/0080450 | A1 | 3/2018 | Glavicic |

*Primary Examiner* — Moshe Wilensky

(74) *Attorney, Agent, or Firm* — Barnes & Thornburg LLP

(57) ABSTRACT

Methods for forming a blade for a gas turbine engine include altering the crystallographic texture of the blade in a discrete region relative to the surrounding locations of the blade to minimize flutter and/or mistune the blade by changing the natural frequency response of at least one mode of the blade.

16 Claims, 7 Drawing Sheets

TAILORED MATERIAL PROPERTY TUNING FOR TURBINE ENGINE FAN BLADES

STATEMENT REGARDING FEDERALLY SPONSORED RESEARCH OR DEVELOPMENT

Embodiments of the present disclosure were made with government support under Contract No. FA8650-19-D-2063 and FA8650-19-F-2078. The government may have certain rights.

FIELD OF THE DISCLOSURE

The present disclosure relates generally to airfoils for gas turbine engines, and more specifically to altering the material properties of airfoils to vary the tuning of the airfoils in the gas turbine engine.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Providing engine equipment to contend with potentially disruptive phenomena, such as flutter, remains an area of interest. Some fan blade systems employ various geometries that redirect airflow or redistribute weight to reduce flutter. Specifically, fan blade systems may include protruding portions that are directly bonded to the fan blade. However, these options increase weight and decrease efficiency. Overall, the existing systems to mitigate the onset of fan blade flutter have various shortcomings relative to certain applications.

Other blade design features and phenomenon, such as natural frequency responses, remain an area of interest as well. For example, further improvements are desired for avoiding natural frequencies of the blades and improving local material capability when engines operate around a natural frequency or cross over a natural frequency of a blade. Accordingly, there remains a need for further contributions in this area of technology.

SUMMARY

The present disclosure may comprise one or more of the following features and combinations thereof.

According to an aspect of the present disclosure, an illustrative method of making a blade for a gas turbine engine includes a number of steps. The method may include calculating a strain profile for a first natural frequency of a virtual blade having a predetermined shape, the strain profile correlating to a deflection of the virtual blade vibrating at the first natural frequency, identifying a first discrete region of the virtual blade, applying at least one of heat and a force to a first discrete region of a stock of material, and forming a physical blade having the predetermined shape from the stock of material such that the first discrete region of the stock of material forms a first region of the physical blade that corresponds in location with the first discrete region of the virtual blade so that at least one of a first natural frequency of the physical blade corresponding to the first natural frequency of the virtual blade and a deflection of the physical blade at the first natural frequency of the physical blade is different from at least one of the first natural frequency of the virtual blade and the deflection of the virtual blade at the first natural frequency of the virtual blade.

In some embodiments, identifying the first discrete region of the virtual blade includes identifying a discrete region of the virtual blade having a greatest magnitude of strain based on the strain profile.

In some embodiments, the method further includes determining a second natural frequency of the virtual blade. The step of identifying the first discrete region of the virtual blade includes identifying a discrete region of the virtual blade in which the first natural frequency of the physical blade will be altered more than a second natural frequency of the physical blade that corresponds with the second natural frequency of the virtual blade.

In some embodiments, the first discrete region is spaced apart from a leading edge, trailing edge, and tip of the blade. In some embodiments, the first discrete region is at a trailing edge of the blade. In some embodiments, the first natural frequency corresponds with one of a first order bend mode of the virtual blade and a first order torsion mode of the virtual blade.

According to an aspect of the present disclosure, an illustrative method of making a blade for a gas turbine engine includes a number of steps. The method may include determining a strain profile of a blade having a first crystallographic texture profile for a first natural frequency of the blade, identifying a first discrete region of the blade in which the strain profile has a greatest magnitude of strain based on the strain profile, and treating the blade at or adjacent the first discrete region to alter the first crystallographic texture profile of the blade around the first discrete region such that the blade has a second crystallographic texture profile that is different from the first crystallographic texture profile and change an elastic modulus of the blade around the first discrete region to modify at least one of a deflection of the blade and the first natural frequency of the blade.

In some embodiments, the step of treating the blade includes at least one of heat treating and forging the blade at or adjacent the first discrete region to alter the first crystallographic texture profile of the blade. In some embodiments, the first natural frequency corresponds with a first order bend mode of the blade. In some embodiments, the first natural frequency corresponds with a first order torsion mode of the blade.

In some embodiments, the method further includes determining a second natural frequency of the blade and the step of treating the first discrete region causes the first natural frequency to change in magnitude greater than it causes a change in magnitude of the second natural frequency of the blade.

In some embodiments, the method further includes forming the blade from a stock of a first material. The step of treating the blade at the first discrete region includes forging the stock of the first material at a location that will become the first discrete region of the blade.

In some embodiments, the first discrete region is spaced apart from a leading edge, trailing edge, and tip of the blade. In some embodiments, the first discrete region is at a trailing edge of the blade.

In some embodiments, the method further includes identifying a second discrete region of the blade in which the strain profile is at a second greatest magnitude based on the strain profile. The method may further include treating the blade at or adjacent the second discrete region to alter the first crystallographic texture profile of the blade.

According to another aspect of the disclosure, a method of making a blade for a gas turbine engine includes a number of steps. The method may include determining a first natural frequency associated with a first vibrational mode of a blade, and treating the blade at a first discrete region to alter a crystallographic texture of the blade at the first discrete region to alter at least one of a deflection of the blade at the first natural frequency and the first natural frequency of the blade.

In some embodiments, the method includes the step of determining the first discrete region based on a calculated strain profile of a virtual blade having same dimensions as the blade. In some embodiments, the method includes providing the blade in physical form having its final external dimensions before the treating step.

In some embodiments, the method may include determining a second natural frequency associated with a second vibrational mode of the blade and the first discrete region is chosen to cause the first natural frequency of the blade to change in magnitude greater than a change in the second natural frequency of the blade. In some embodiments, the method includes identifying a second discrete region of the blade and treating the blade at the second discrete region to alter the crystallographic texture of the blade at the second discrete region.

These and other features of the present disclosure will become more apparent from the following description of the illustrative embodiments.

DETAILED DESCRIPTION OF THE DRAWINGS

Figure 1:
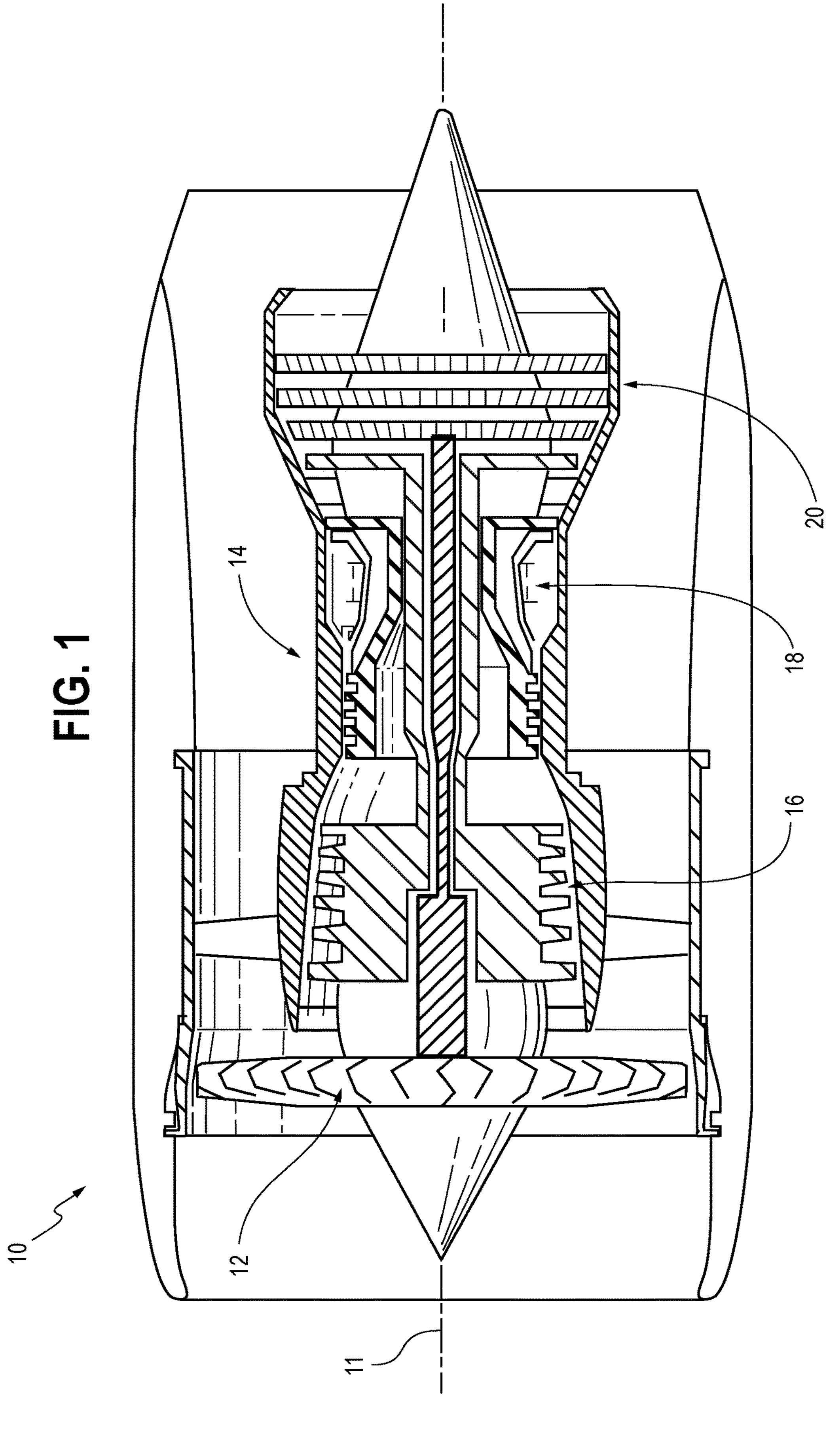
FIG. 1 is cutaway view of a gas turbine engine having a fan assembly and an engine core that includes a compressor, a combustor, and a turbine.

For the purposes of promoting an understanding of the principles of the disclosure, reference will now be made to a number of illustrative embodiments illustrated in the drawings and specific language will be used to describe the same.

Referring to FIG. 1, a turbofan engine 10 is illustrated having a fan assembly 12 and an engine core 14 having a compressor section 16, a combustor 18, and a turbine section 20, which together can be used to produce a useful power. Air enters the turbofan engine 10, is compressed through action of the compressor 16, mixed with a fuel, and combusted in the combustor 18. The turbine 20 is arranged to receive a flow from the combustor 18 and extract useful work from the flow. The fan assembly 12 includes fan blades 22 coupled to a disk 24 that transfers power from a shaft to rotate the blades 22 about an axis 11. Further, the present disclosure contemplates use in other applications that may not be aircraft related such as industrial fan applications, power generation, pumping sets, naval propulsion, weapon systems, security systems, perimeter defense/security systems, and the like known to one of ordinary skill in the art.

Figure 2:
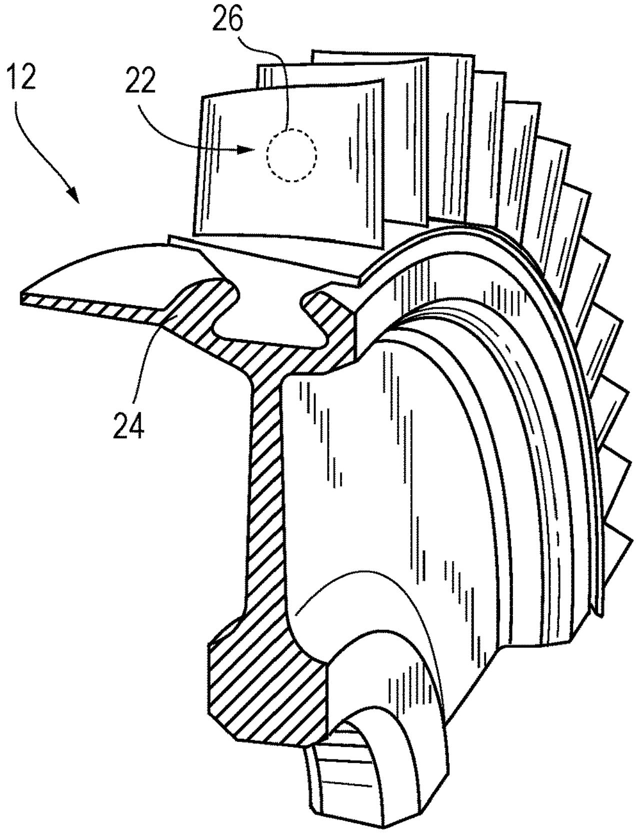
FIG. 2 is a perspective cutaway view of a fan rotor assembly having a disk and a plurality of airfoil shaped blades coupled with the disk for rotation therewith and each of the blades are treated in discrete regions to alter at least one of a natural frequency of the blade and a deflection of the blade at the natural frequency.
Figure 2A:
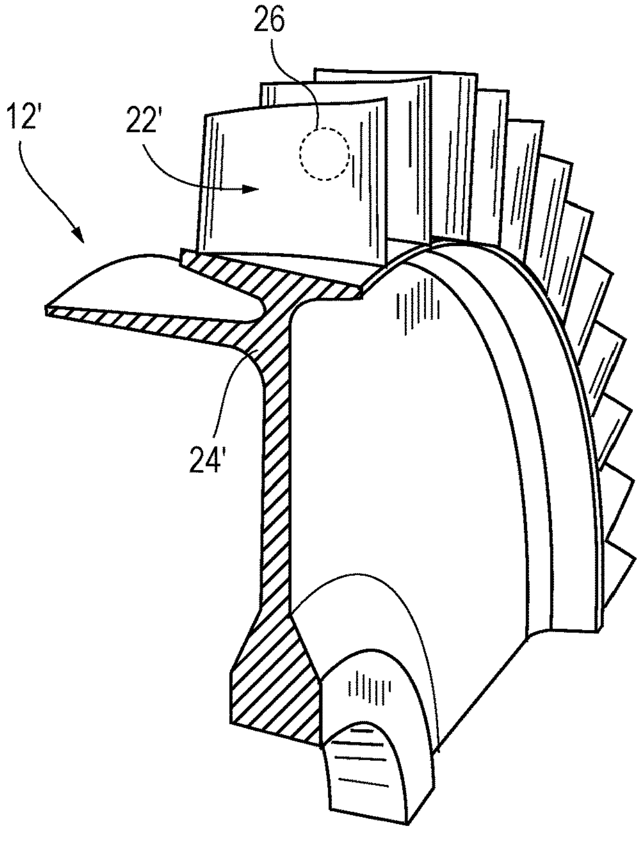
FIG. 2A is a perspective cutaway view of another fan rotor assembly in which the plurality of blades are integrally formed with the disk to provide a blisk and each of the blades are treated in discrete regions to alter at least one of a natural frequency of the blade and a deflection of the blade at the natural frequency.

FIGS. 2 and 2A show side sectional views of two fan assemblies 12, 12'. FIG. 2 shows the fan assembly 12 with a mechanical blade-disk attachment in which the fan blade 22 has a dovetail that is retained by the disk 24 a (analogous to a tongue and groove). FIG. 2A shows the fan assembly 12' with a blisk arrangement in which the fan blade 22' is attached to the disk 24' (to form a blisk) by a weld or machined from a solid stock of material rather than a dovetail or other root geometry that extends into a disk. The methods, features, and apparatuses of the present disclosure apply to both mechanical attachment arrangements such as fan assembly 12 as well as blisk arrangements such as fan assembly 12'.

Each blade 22 includes a leading edge 30, a trailing edge 32, a pressure side 34, and a suction side 36 as shown in FIGS. 3-7. Each blade 22 includes a shank 41 and an airfoil that extends from a root 38 coupled at the shank 41 to radially outer tip 40.

Fan and compressor rotor airfoils in gas turbine engines may be susceptible to excessive dynamic responses from intake distortion, flutter, and other aeromechanical influences. Excessive vibration of these airfoils can lead to airfoil failure and engine shutdown. According to the present disclosure, the alloy structure of metals, such as Ti64, that form the blades 22 may be altered to drive local material mechanical property changes, mainly Elastic Modulus, in the fan blade 22 to change the mode shape and/or natural frequencies relative to that of a blade 22 with homogeneous material. By locating a region 26 or regions 26 of altered material properties within the blade 22, the mode shape and or frequency of the blade 22 can be changed. This can be beneficial to improve flutter capability (mode shape tailoring) or by modifying the frequency of a given mode to avoid synchronous crossings or to improve local material capability at a crossing. The present disclosure is applicable to bladed or blisk (integral airfoils and hub) rotor assemblies 12, 12'.

Figure 3:
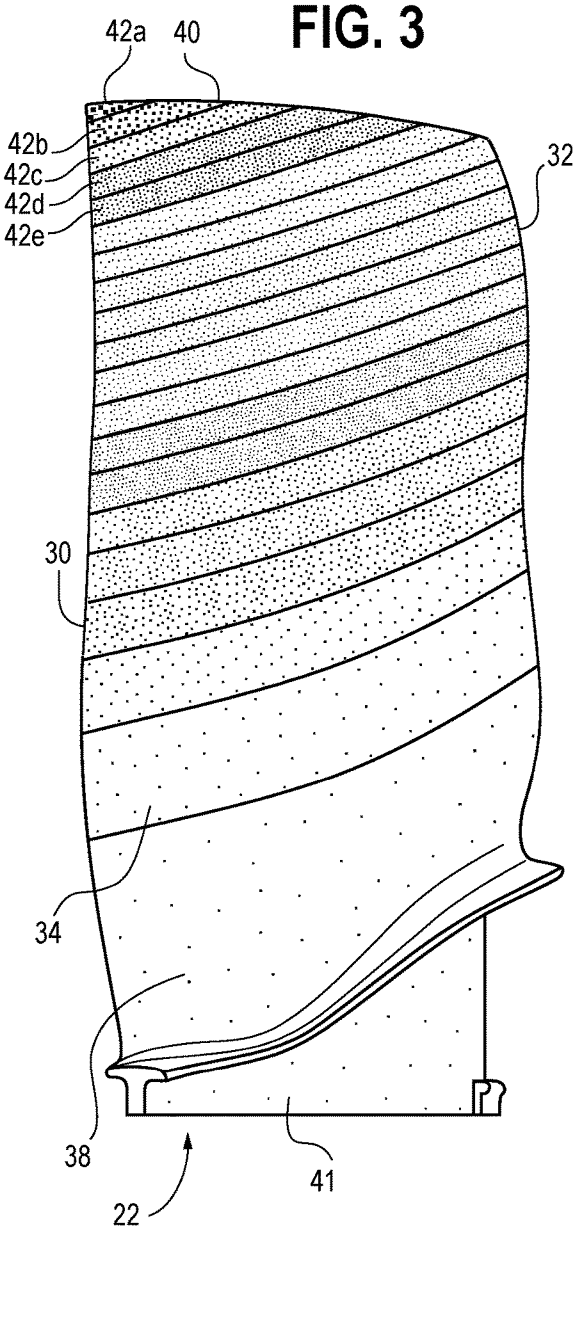
FIG. 3 is a diagrammatic side view of one of the blades of the fan assembly of FIG. 2 showing a displacement profile of the blade vibrating at a first natural frequency that is associated with its first bend mode.
Figure 4:
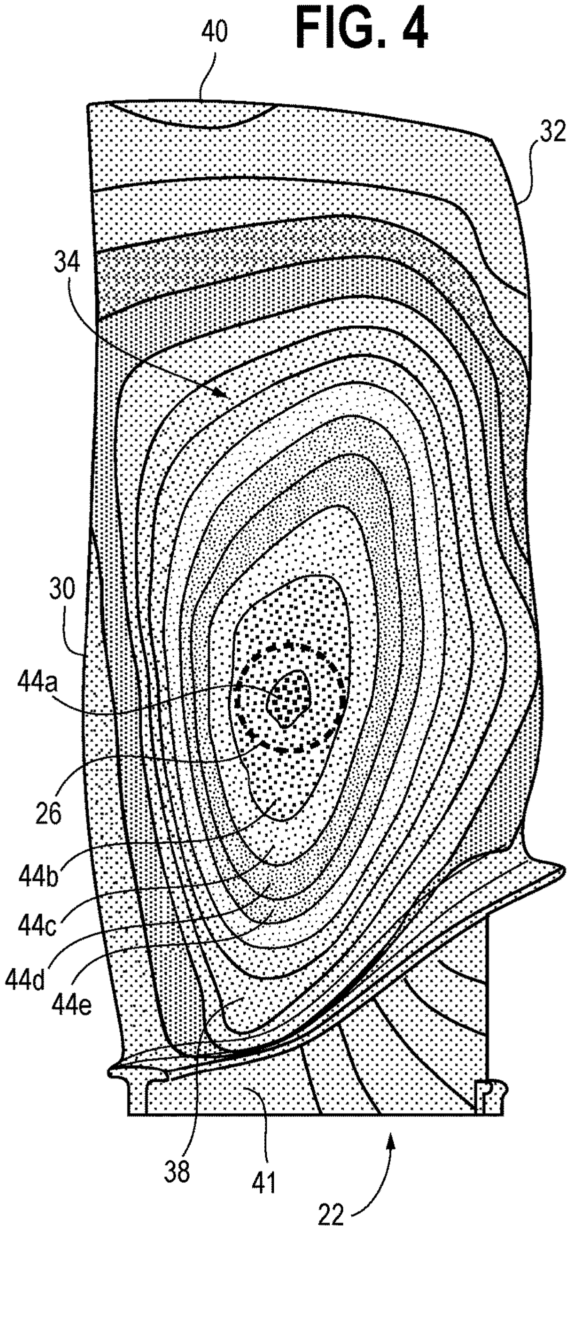
FIG. 4 is a diagrammatic side view of the blade of FIG. 3 showing a strain profile of the blade vibrating at the natural frequency associated with its first bend mode.

The mode shape of a blade 22 or airfoil may be tailored to be less susceptible to flutter (negative aero damping). FIG. 3 depicts example blade displacement of the first bend mode of the blade 22 and FIG. 4 depicts example strain of the first bend mode. It conceivable that similar changes may yield some benefit for other modes excited by aerodynamic phenomenon as well, such as first torsion mode and second flexural mode.

Figure 5:
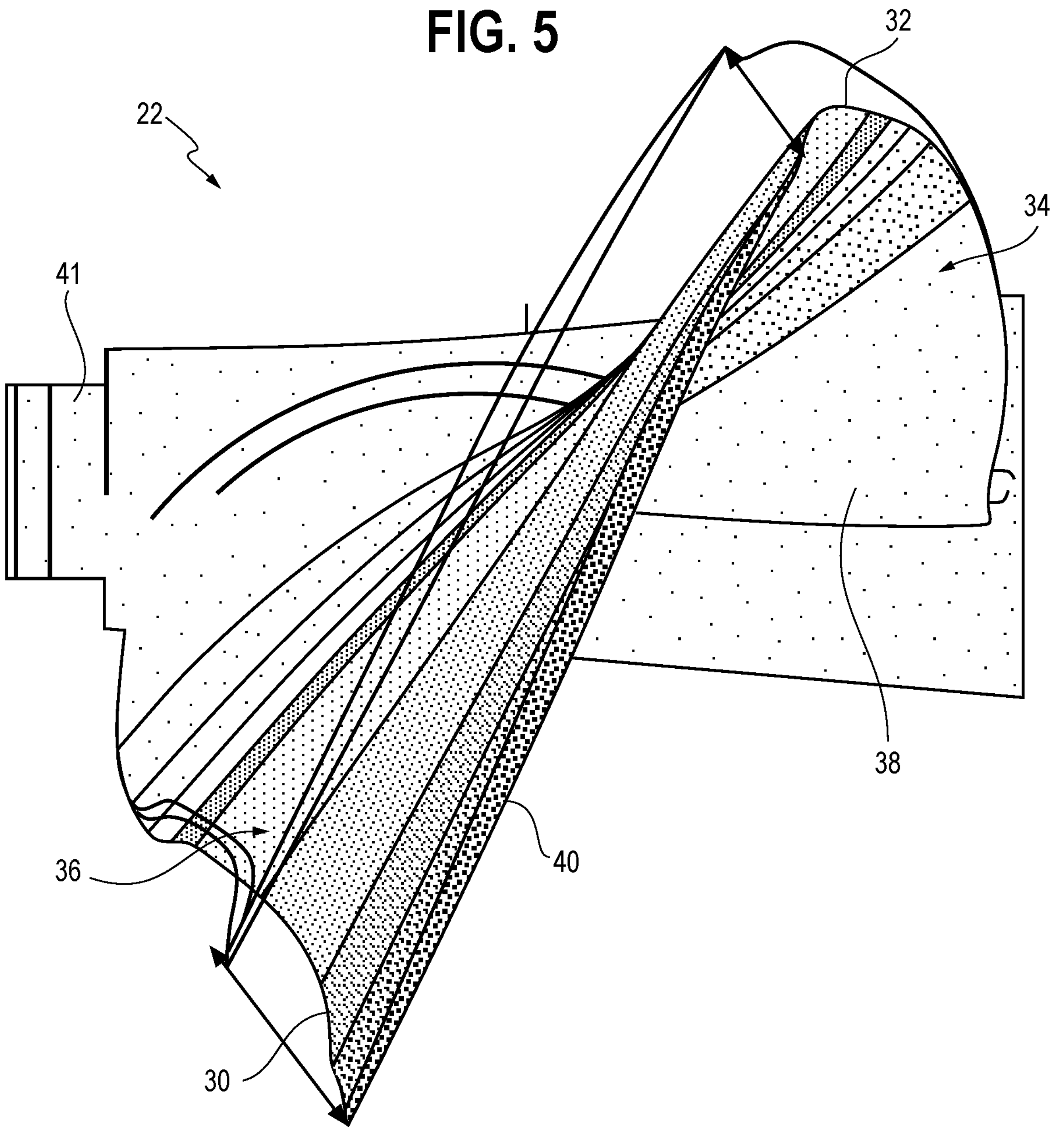
FIG. 5 is a top view of the blade of FIGS. 3 and 4 showing a torsion component of the mode shape of the blade vibrating at the natural frequency.

In particular, a deflection profile of the blade 22, as shown in FIG. 3, and a strain profile of the blade 22, as shown in FIG. 4, are determined for a firstly chosen natural frequency of the blade 22. For example, the first chosen natural frequency may be the natural frequency associated with the first bend mode, first torsion mode, second bend mode, second torsion mode, etc. A depiction of the twist component of the blade 22 for the first chosen natural frequency is shown in FIG. 5. The illustrative natural frequency of the blade 22 used to generate FIGS. 3-5 is the natural frequency associated with the first bend mode of the blade. The deflection profile and the strain profile of the illustrative embodiment are calculated based on a virtual blade using finite element analysis or other computational method. In other embodiments, the deflection profile and the strain profile are determined based upon measurements taken from a physical blade.

As shown in FIG. 5, there is a torsional component of the bend mode as the leading edge 30 of the blade 22 moves more than the trailing edge 32. The torsional aspect of the mode shape is generally bad for flutter and design efforts are made to minimize it. In order to minimize the torsion in the first bend mode shape, the modulus of the material can be adjusted in the region 44*e* of high strain to reduce the amount of deflection on the leading edge 30, thus, reducing the torsional component of the mode shape.

Different magnitudes of deflection in the blade 22 for the first natural frequency are grouped together in regions 42*a*, 42*b*, 42*c*, 42*d*, 42*e* . . . etc. as shown in FIG. 3. The greatest deflection of the blade 22 is illustratively shown near the tip 40 and the leading edge 30 in region 42*a*. The second greatest deflection of the blade 22 is in region 42*b*, and the deflection reduces as the regions move radially inward toward the root 38.

The strain profile of FIG. 4 show different magnitudes of strain grouped together in regions 44*a*, 44*b*, 44*c*, 44*d*, 44*e* . . . etc. The greatest magnitude of strain for the given natural frequency is in region 44*a* in the illustrative embodiment. The region 44*a* is illustratively located axially spaced apart from the leading edge 30 and the trailing edge 32 of the blade 22 and radially spaced apart from the root 38 and the tip 40. The second greatest magnitude of strain for the given natural frequency is in region 44*b* and the strain reduces as the regions move outwardly away from region 44*a*. Notably, at other natural frequencies of the blade 22, there may be multiple regions of the greatest strain or of great strain as suggested in FIG. 7.

The strain profile of FIG. 4 correlates with the deflection profile of the blade 22 shown in FIG. 3. The region 44*a* of greatest strain in FIG. 4 can be thought of as an area of the blade 22, which is acting as a fulcrum in which the tip 40 of the blade is deflected to allow the greatest amount of strain to occur in the region 42*a*.

According to the present disclosure, the discrete region 26 near the region 44*a* of greatest strain in the blade 22 is treated to alter the crystallographic texture of the region 26 and, thus, change the first natural frequency value and/or the magnitude of deflection of the blade 22 at the first natural frequency. For example, a blade having the same geometry and manufacturing process except for treatment of the discrete region 26 may have a natural frequency of 100 Hertz. A blade having the same geometry, manufacturing process, and treatment of the discrete region 26 may have a different natural frequency such as 110 Hertz or 93 Hertz. In this way, the first chosen natural frequency of the blade 22 may be altered up or down without significantly altering other natural frequencies of the blade 22 as discussed further below.

The blade having the same geometry and manufacturing process except for treatment of the discrete region 26 has the deflection profile as shown in FIG. 3. In contrast, a blade having the same geometry, manufacturing process, and treatment of the discrete region 26 has a different deflection profile from FIG. 3. The discrete region 26 and treatment are selected to reduce a magnitude or shape of peak deflection region of the blade 22 as compared to the peak deflection region 42*a* in FIG. 3. The treatment includes at least one of heat treating the region 26 and/or applying a force to the region 26 for example such as forging or rolling the region 26.

The discrete region 26 or discrete regions 26 of the blade 22 receive a treatment that is not applied to the entire blade 22. For example, the discrete region(s) 26 are less than 5 percent of the surface area of the blade 22 in some embodiments. In some embodiments, the discrete region(s) 26 comprises less than 10 percent of the surface area of the blade 22. In some embodiments, the discrete region(s) 26 comprises less than 15 percent of the surface area of the blade 22. In some embodiments, the discrete region(s) 26 comprises less than 20 percent of the surface area of the blade 22. In some embodiments, the discrete region(s) 26 comprises less than 25 percent of the surface area of the blade 22. In some embodiments, the discrete region(s) 26 comprises less than 30 percent of the surface area of the blade 22. In some embodiments, the discrete region(s) 26 comprises less than 10 percent of the surface area of the blade 22.

If the strain profile is generated using a virtual blade such as using finite element analysis, the physical blade is treated in the discrete region(s) 26 so as to have a deflection and strain profile and/or different value for the first chosen natural frequency that are different from the calculated profiles and frequency of the virtual blade. In other words, treatment in the discrete region 26 can be performed proactively and during manufacture of the blade 22 based on calculated strains and deflection profiles determined during the design of the blade 22. Alternatively, pre-existing blades 22 may be treated in the discrete region 26 to alter the properties of the pre-existing blade 22 compared to its properties before treatment.

Changing the material properties of the blade 22, notably, the crystallographic texture of the region 26 has little to no impact on the blade geometry. As a result, the change has little to no effect on the aerodynamic performance of the blade 22. In contrast, traditionally changing the mode shape of a blade would be achieved via adjustments to the thickness or thickness distribution in the blade or blade metal angles and, thus, would have a significant impact on aerodynamic performance of the blade.

Figure 6:
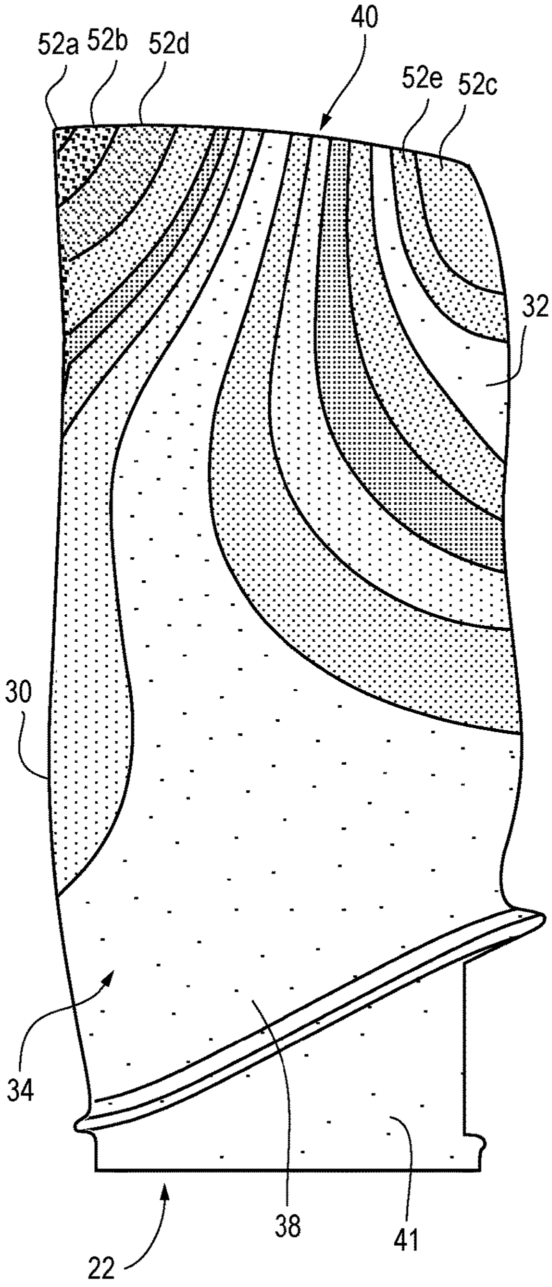
FIG. 6 is a diagrammatic side view of one of the blades of the fan assembly of FIG. 2 showing a displacement profile of the blade vibrating at a natural frequency associated with its first torsion mode.
Figure 7:
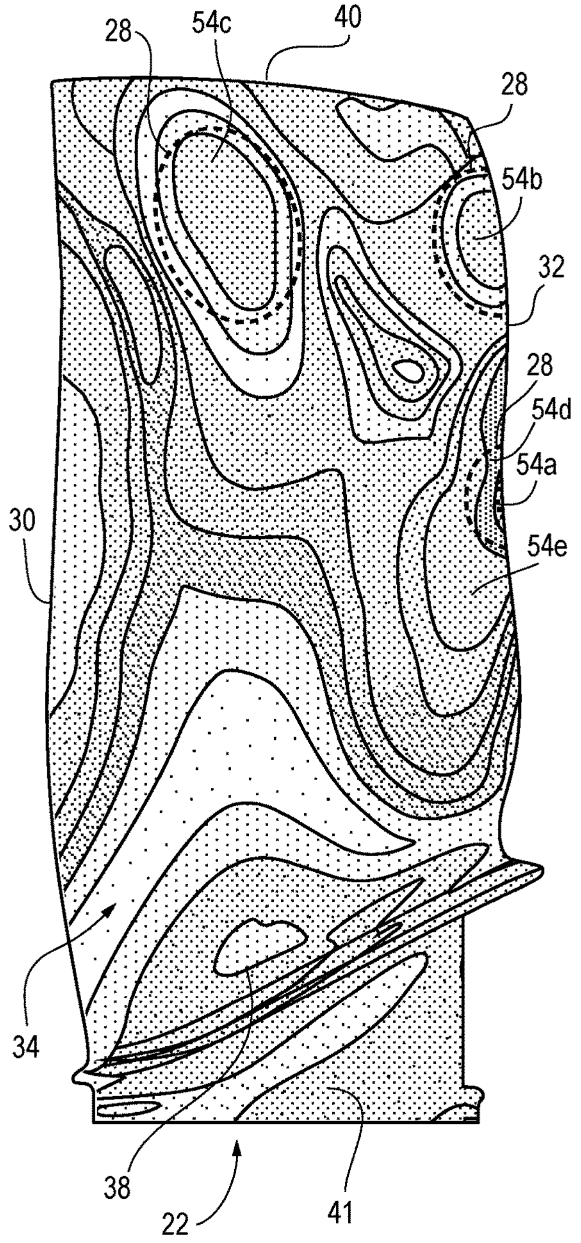
FIG. 7 is a diagrammatic side view of the blade of FIG. 6 showing a strain profile of the blade vibrating at a second natural frequency that is associated with its first torsion mode.

FIGS. 6 and 7 show the deflection and strain profiles, respectively, of the blade 22 at a second chosen natural frequency different from the first chosen natural frequency of the blade 22. The illustrative deflection and strain profiles of FIGS. 6 and 7 correspond with the natural frequency of blade 22 that results in a first torsion mode of the blade.

Different magnitudes of deflection in the blade 22 for the second chosen natural frequency are grouped together in regions 52*a*, 52*b*, 52*c*, 52*d*, 52*e* . . . etc. as shown in FIG. 6. The greatest deflection of the blade 22 is illustratively shown near the tip 40 and the leading edge 30 in region 52*a*. The second greatest deflection of the blade 22 is in region 52*b*, another region of relatively higher deflection is shown near the tip 40 and the trailing edge 32, and the deflection reduces as the regions 52 move radially inward toward the root 38 away from the region 52*a* and 52*c*.

The strain profile for the second chosen natural frequency of the blade of FIG. 7 show different magnitudes of strain grouped together in regions 54*a*, 54*b*, 54*c*, 54*d*, 54*e* . . . etc. The greatest magnitude of strain for the given natural frequency is in region 54*a* in the illustrative embodiment. The region 54*a* is illustratively located at the trailing edge 32 of the blade 22 and radially spaced apart from the root 38 and the tip 40. The secondary large magnitudes of strain for the given natural frequency is in regions 54*b* and 54*c*, which are spaced apart radially and axially relative to region 54*a*.

The number and locations of high strain regions 54*a*, 54*b*, 54*c* show that the strain in the blade 22 may differ by location for any given chosen natural frequency. The region 44*a* of highest strain for the first chosen natural frequency (illustratively the first bend mode) is different than the region 54*a* of highest strain for the second chosen natural frequency (illustratively the first torsion mode).

Figure 8:
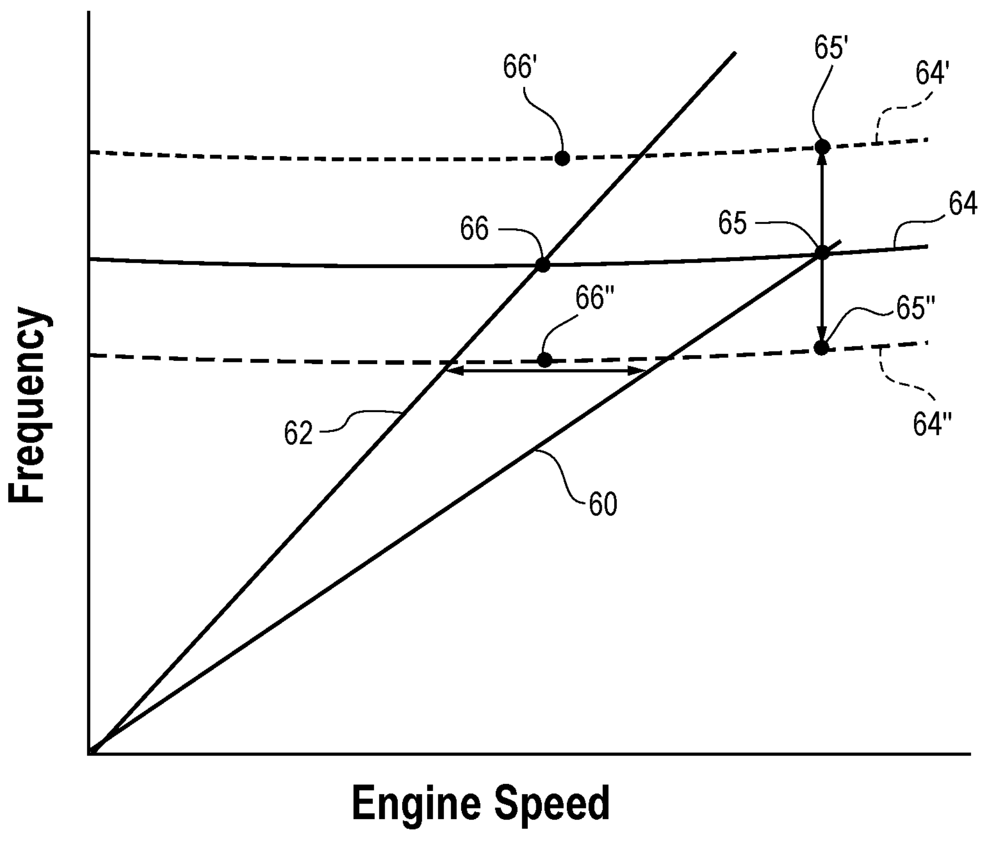
FIG. 8 is a graph showing frequency of the blades as compared to engine speed of the gas turbine engine and suggesting that the natural frequency lines of the blades can be moved in response to treating the blades in the discrete regions(s) to avoid natural frequency crossings in the engine speed ranges or to reduce some natural frequencies without altering other natural frequencies of the blades.

According to the present disclosure, the modulus of the blade 22 may be tailored in a given region 44 or 54 of the blade to change the frequency of a specific mode (first bend mode, first torsion mode, etc.) to avoid crossings on the Campbell diagram as suggested in FIG. 8. The elastic modulus of the blade could be altered in the high strain regions 54*a*, 54*b*, 54*c* of the first torsion mode (shown in FIG. 7) to alter the frequency at which the mode occurs, without impacting the frequency at which the first bend mode occurs.

FIG. 8 shows a frequency of vibrations and other responses generated by the gas turbine engine 10 due to operation of the engine 10 as compared to an engine speed (shaft rotation speed) of the gas turbine engine 10. An illustrative first engine order line 60 and a second engine order line 62 are depicted on the graph of FIG. 8. A first chosen natural frequency line 64 of the blades 22 is shown in solid line. If no targeted treatment is performed on the blade 22, the first engine order line 60 and the first natural frequency line 64 intersect at point 65 suggesting that operation of the gas turbine engine 10 will excite and vibrate the blade 22 during the typical operating envelope of the gas turbine engine 10. Similarly, the second engine order line 62 and the first natural frequency line 64 intersect at point 66.

As suggested in Campbell diagram of FIG. 8, the elastic modulus in the discrete region(s) 26, 28 of the blade could either be increased, to increase the mode frequency, or decreased to decrease the mode frequency so as to avoid a crossing all together. The treating of the discrete region(s) 26, 28 of the blade either increases or decreases the mode frequency.

For example, the discrete regions 26 and/or 28 could be selected and treated to cause the first chosen natural frequency line to shift upward to line 64'. The engine speed which would have resulted in intersection point 65 does not intersect the increased first natural frequency line 64' as suggested by point 65' being spaced apart from the first engine order line 60. As such, operating the gas turbine engine 10 in its operating envelope no longer generates a vibratory response with the first engine order for the first chosen natural frequency of the blade 22. As suggested by point 66' being spaced apart from the second engine order line 62, the second engine order line 62 would intersect the increased first natural frequency line 64' further up and to the right indicating that the engine speed at which the blades 22 respond at their first chosen natural frequency for the second engine order has increased.

Alternatively, the first chosen natural frequency of the blades 22 could be moved downwardly from line 64 to line 64" as suggested in FIG. 8 by using different treatment orientations or selecting different discrete regions 26, 28 on the blade. This would decrease that natural frequency and reduce a speed of the crossing the engine order lines 60, 62 without impacting the frequency of other modes (other natural frequencies of the blades). In contrast to the treatment of discrete regions 26, 28 of the present disclosure, adjusting the frequency at which a single mode occurs would traditionally be achieved in varying the thickness or thickness distribution changes of the blade. This would result in an impact on the aerodynamic performance of the airfoil and possibly impact the frequencies of other modes as the mass distribution in the airfoil would change.

By decreasing the natural frequency of the blade 22, the point 65 would be moved downwardly to point 65" away from intersecting the first engine order line 60 at the given engine speed for point 65. Instead, the first engine order line 60 and the decreased natural frequency 64" would intersect at a lower engine speed. Similarly, point 66 would move to point 66" and the second engine order line 62 and the decreased natural frequency 64" would intersect at a lower engine speed as compared to point 66.

Altering the crystallographic texture of discrete region(s) 26, 28 of the blade 22 may provide flutter improvements and Campbell diagram improvements without changing the aerodynamic shape of the blade 22. Changes can be tailored to the frequency of the mode of interest (first bend mode, first torsion mode, etc.) and the impact on the frequency of other modes of the blade 22 can be minimized. For example, a first natural frequency of the blade 22 can be increased or decreased by a first magnitude by treating one or more discrete region(s) 26, 28 and a second (and/or third, fourth, etc.) natural frequency of the blade 22 is not changed or increased or decreased by a second magnitude that is less than the first magnitude.

Example method steps for treating blades 22 in accordance with the present disclosure are provided below. In some embodiments, a virtual blade is generated on a computer and values for strain and deflection are calculated using finite element analysis. The analysis is used to treat the stock of material during the blade forming process. As a result, the final blade 22 has different strain and deflection properties as desired as compared to the deflection and strain profiles of the virtual blade generated on the computer. In other embodiments, a first blade is physically produced and tested and the test results are used to treat future blades of similar dimensions to obtain the desired altered blade characteristics. In other examples, each blade 22 is produced without the treatment and then treated post-production so that each individual blade 22 is treated to change its properties post-production of the blade 22.

In one example, a method of making the blade 22 for the gas turbine engine 10 includes calculating a strain profile for a first natural frequency of a virtual blade having a predetermined shape as suggested in FIG. 4. The strain profile correlating to a deflection of the virtual blade vibrating at the first natural frequency as suggested in FIG. 3. The first discrete region 26, 28 of the virtual blade 22 is identified. The region 26, 28 may be chosen because they are the greatest locations of strain or based on the knowledge that modifying the region 26, 28 will result in the desired alteration to natural frequency or deflection of the blade 22.

Figure 10:
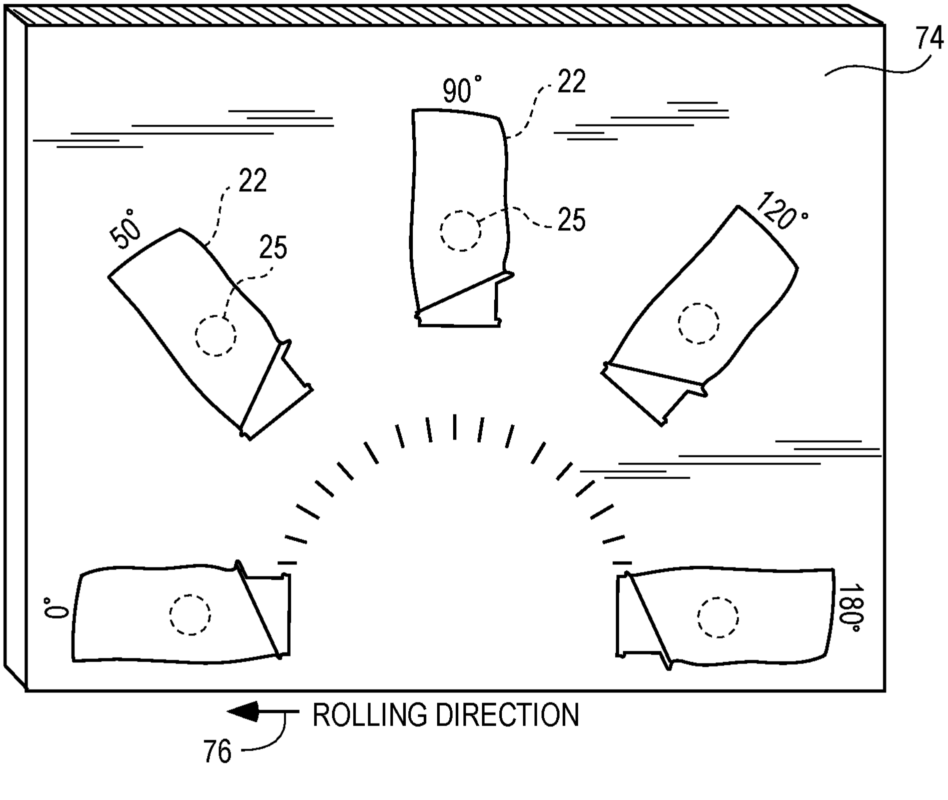
FIG. 10 is a diagrammatic view of a stock of material that will become blades for the gas turbine engine and suggesting that the stock of material can be treated at different orientations at locations that will become the discrete regions on the blades to alter the properties of the blades in the discrete region.

The method continues with applying at least one of heat and a force to the first discrete region(s) 25 of a stock of material 74 as suggested in FIG. 10. A physical blade 22 is formed from the stock of material 74 having the predetermined shape of the blade such that the first discrete region(s) 25 of the stock of material 74 forms region(s) 26, 28 of the physical blade 22 that correspond in location with the discrete region(s) 26, 28 of the virtual blade. As a result, at least one of a first natural frequency of the physical blade 22 corresponding to the first natural frequency of the virtual blade and a deflection of the physical blade 22 at the first natural frequency of the physical blade 22 is different from at least one of the first natural frequency of the (untreated) virtual blade and the deflection of the (untreated) virtual blade at the first natural frequency of the virtual blade.

In some embodiments, identifying the first discrete region of the virtual blade includes identifying a discrete region 26, 28 of the virtual blade having a greatest magnitude of strain based on the strain profile as suggested in FIGS. 4 and 7. In some examples, the method includes determining a second natural frequency of the virtual blade and the step of identifying the first discrete region 26, 28 of the virtual blade includes identifying a discrete region of the virtual blade in which the first natural frequency of the physical blade 22 will be altered more than a second natural frequency of the physical blade 22 that corresponds with the second natural frequency of the virtual blade is altered by the first discrete region being treated.

In some embodiments, the first discrete region 26 is spaced apart from a leading edge 30, trailing edge 32, and tip 40 of the blade 22 as suggested in FIG. 4. In some embodiments, the first discrete region 28 is at a trailing edge 32 of the blade 22 as suggested in FIG. 7.

Another method of making a blade 22 includes determining a strain profile of the blade 22 having a first crystallographic texture profile for a first natural frequency of the blade 22. The first discrete region 26, 28 of the blade 22 in which the strain profile has a greatest magnitude of strain based on the strain profile is identified. The blade 22 is treated at or adjacent the first discrete region 26, 28 to alter the first crystallographic texture profile of the blade 22 around the first discrete region 26, 28 such that the blade 22 has a second crystallographic texture profile that is different from the first crystallographic texture profile.

The method may include determining a second natural frequency of the blade 22. Treating the first discrete region 26 28 may cause the first natural frequency to change in magnitude greater than it causes a change in magnitude of the second natural frequency of the blade 22.

The blade 22 may be made from a stock of a first material 74. Treating the blade 22 at the first discrete region 26, 28 includes forging the stock of the first material 74 at a region 25 that will become the first discrete region 26, 28 of the blade. In some embodiments, a second discrete region 28 of the blade 22 in which the strain profile is at a second greatest magnitude based on the strain profile is identified. The blade 22 is treated at or adjacent the second discrete region 28 to alter the crystallographic texture profile of the blade 22.

Existing blades 22 with flutter margin or Campbell diagram issues may be improved using the material processing methods of the present disclosure. This may be beneficial for issues discovered late in the design process or if the engine is moved to different aircraft installations.

Turbofan engine systems, such as gas turbine engine 10, have numerous performance characteristics to consider including: fuel efficiency, component strength, useful life, fan blade off (FBO) containment (which may entail debris of various size and energy), noise emission, and power output. The fan blades 22 of the gas turbine engine 10 may be made of a metal, such as titanium, or an alloy of various metals. Such alloys include Ti-6Al-4V (Ti-64) and Ti-6Al-2Sn-4Zr-2Mo-0.15Si (Ti-6242). The disk may be made from the same material as the blades, or a different metal altogether. The design constraints for disks and blades are somewhat different. For example, high tensile strength and low cycle fatigue resistance may be most relevant for disk materials, and high cycle fatigue and creep resistance are the main desired characteristics for blades. For example the disk 24 may be made of Ti-6Al-2Sn-4Zr-6Mo (Ti-6246) or Ti-5Al-2Sn-2Zr-4Mo-4Cr (Ti-17) or IN718. The fan assembly 12 may further include a barrel made of metallic material, such as aluminum, or composite, and the containment blanket is typically made of dry fabric wrap comprising an aramid fiber such as KEVLAR™.

During a flutter event, the fan blades 22 are not designed to have sufficient capability to withstand the structural loads that exist. Instead, the design is chosen to ensure flutter does not occur during operation. Hollow fan blades 22 may be optimized to be light and strong and may have significant cost and weight advantages over solid fan blade systems. Those benefits would be significantly reduced if the fan blade size was increased or if additional features were added to reduce the onset of flutter.

Flutter is an aero-structural self-excited vibration that leads to undesired instability and is common with fan blades. Some important forms of flutter include stall flutter, unstalled flutter, supersonic unstalled flutter, supersonic stalled flutter, trans-sonic stalled flutter, and choke flutter.

The crystallographic texture of a material is a statistical measure of what proportion of the macroscopic material is aligned to specific crystallographic directions. The formation of a crystallographic texture as a result of the thermo-mechanical processing of the alloy can change the effective elastic modulus that a macroscopic component will exhibit depending upon the thermos-mechanical processing path followed. For example, texture can be controlled by controlling the direction of processing such as by rolling a sheet of titanium, or forging the anisotropic material in a way that causes the material to undergo strain that results in a desired crystallographic texture.

Many physical, chemical and mechanical properties of crystals depend on their crystalline orientations and it follows that directionality or anisotropy of these properties will result wherever a texture exists in polycrystalline materials.

Some of the important examples are elastic modulus (E), Poison's ratio, strength, ductility, toughness, magnetic permeability and the energy of magnetization. These types of anisotropy apply to materials of cubic as well as lower crystal symmetry. In hexagonal metals, other properties such as thermal expansion and electrical conductivity may also show directionality.

Figure 9:
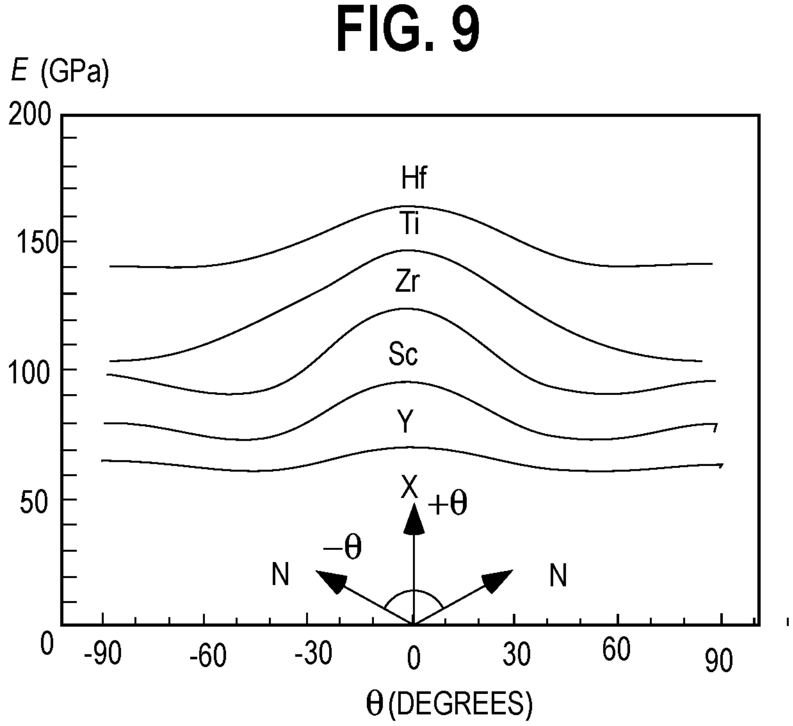
FIG. 9 is a graph showing angular modulus behavior for different materials.

Referring to FIG. 9, the angular modulus behavior of E for 0°<θ<90° for the group of hexagonal close-packed metals comprising: hafnium (Hf), titanium (Ti), zirconium (Zr), and scandium (Sc). As a general observation, with the exception of titanium, E-behavior in FIG. 9 tends to exhibit a maximum on the (0001) basal plane (i.e. when θ is zero and N coincides with the [0001] direction) and a maximum (in some cases) on the prismatic planes where θ is 90°. In most cases, E tends to exhibit a minimum value between 0°<θ<90°. In the case of Ti, the behavior of E exhibits a maximum when θ is zero and a minimum when θ is 90°. This illustrates the anisotropic nature of various HCP materials with regard to modulus of elasticity.

It is possible to make some general comments on the effects of crystallographic texture on elastic anisotropy of HCP polycrystals. First, the metals with polar diagrams which most approach circularity with an anisotropy factor close to unity should experience smaller directional variations in the resulting elastic moduli, E and G, as result of metal processing. These include Mg and Y. In contrast, metals with significant departures from circularity, and anisotropy factors much less or greater than unity, are likely to experience considerable directional variations in their elastic moduli as a result of processing. In particular, these include Zn and Cd. Important metals such as Be, Ti Zr and Co are likely to experience some variations in their polycrystal moduli, but not to the same extent as Zn and Cd.

If a strong texture is present, it is possible to anticipate some elastic anisotropy effects. Extruded rods of hexagonal metals such as pure Ti often exhibit a cylindrical symmetry fiber texture where the basal plane poles (i.e. [0001]) of the grains are perpendicular to the extrusion axis. Consequently, the tensile modulus along the extrusion axis should approach that of the modulus normal to the prismatic planes of the monocrystal (~104 GPa).

Referring to FIG. 10, the mechanical properties of a stock of material of titanium alloy 74 may be treated in regions 25 that will become the discrete regions 26 or 28 of the blade 22. The discrete regions 26, 28 may be treated at various angles with respect to the processing direction, which is the rolling direction 76 to achieve different frequency and/or deflection changes in the blades 22. In some embodiments, the blades 22 are formed from machining a billet 74 and in some embodiments, the blades 22 are formed by coupling a first plate 74 with a second plate of material.

The outline of blades 22 are shown as illustrative examples to indicate that treated region 25 will become region 26 in the finalized blade 22. In some embodiments, each blade 22 of a rotor is formed and treated with substantially the same processes. For example, a rolling direction of 50 degrees would be used for all blades 22 on a rotor. In other embodiments, different blades on a single rotor are treated and processed differently, such as with different locations of regions 26, 28 or different treatment directions, temperatures, forces, etc.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of making a blade for a gas turbine engine, the method comprising calculating a strain profile for a first natural frequency of a virtual blade having a predetermined shape, the strain profile correlating to a deflection of the virtual blade vibrating at the first natural frequency, identifying a first discrete region of the virtual blade, applying at least one of heat and a force to a first discrete region of a stock of material, and forming a physical blade having the predetermined shape from the stock of material such that the first discrete region of the stock of material forms a first region of the physical blade that corresponds in location with the first discrete region of the virtual blade so that at least one of a first natural frequency of the physical blade corresponding to the first natural frequency of the virtual blade and a deflection of the physical blade at the first natural frequency of the physical blade is different from at least one of the first natural frequency of the virtual blade and the deflection of the virtual blade at the first natural frequency of the virtual blade, further comprising determining a second natural frequency of the virtual blade and the step of identifying the first discrete region of the virtual blade includes identifying a discrete region of the virtual blade in which the first natural frequency of the physical blade will be altered more than a second natural frequency of the physical blade that corresponds with the second natural frequency of the virtual blade.

2. The method of claim 1, wherein identifying the first discrete region of the virtual blade includes identifying a discrete region of the virtual blade having a greatest magnitude of strain based on the strain profile.

3. The method of claim 1, wherein the first discrete region is spaced apart from a leading edge, trailing edge, and tip of the blade.

4. The method of claim 1, wherein the first discrete region is at a trailing edge of the blade.

5. The method of claim 1, wherein the first natural frequency corresponds with one of a first order bend mode of the virtual blade and a first order torsion mode of the virtual blade.

6. A method of making a blade for a gas turbine engine, the method comprising determining a strain profile of a blade having a first crystallographic texture profile for a first natural frequency of the blade, identifying a first discrete region of the blade in which the strain profile has a greatest magnitude of strain based on the strain profile, and treating the blade at or adjacent the first discrete region to alter the first crystallographic texture profile of the blade around the first discrete region such that the blade has a second crystallographic texture profile that is different from the first crystallographic texture profile and change an elastic modulus of the blade around the first discrete region to modify at least one of a deflection of the blade and the first natural frequency of the blade, further comprising determining a second natural frequency of the blade and the step of treating the first discrete region causes the first natural frequency to change in magnitude greater than it causes a change in magnitude of the second natural frequency of the blade.

7. The method of claim 6, wherein the step of treating the blade includes at least one of heat treating and forging the blade at or adjacent the first discrete region to alter the first crystallographic texture profile of the blade.

8. The method of claim 6, wherein the first natural frequency corresponds with a first order bend mode of the blade.

9. The method of claim 6, wherein the first natural frequency corresponds with a first order torsion mode of the blade.

10. The method of claim 6, wherein the first discrete region is spaced apart from a leading edge, trailing edge, and tip of the blade.

11. The method of claim 6, wherein the first discrete region is at a trailing edge of the blade.

12. The method of claim 6, further comprising identifying a second discrete region of the blade in which the strain profile is at a second greatest magnitude based on the strain profile and treating the blade at or adjacent the second discrete region to alter the first crystallographic texture profile of the blade.

13. A method of making a blade for a gas turbine engine, the method comprising determining a first natural frequency associated with a first vibrational mode of a blade, and treating the blade at a first discrete region to alter a crystallographic texture of the blade at the first discrete region to alter at least one of a deflection of the blade at the first natural frequency and the first natural frequency of the blade, further comprising determining a second natural frequency associated with a second vibrational mode of the blade and the first discrete region is chosen to cause the first natural frequency of the blade to change in magnitude greater than a change in the second natural frequency of the blade.

14. The method of claim 13, further comprising the step of determining the first discrete region based on a calculated strain profile of a virtual blade having same dimensions as the blade.

15. The method of claim 13, further comprising providing the blade in physical form having its final external dimensions before the treating step.

16. The method of claim 13, further comprising identifying a second discrete region of the blade and treating the blade at the second discrete region to alter the crystallographic texture of the blade at the second discrete region.

* * * * *